United States Patent [19]

Yamano

[11] Patent Number: 5,448,051
[45] Date of Patent: Sep. 5, 1995

[54] AUTOMATIC FOCUSING APPARATUS FOR MOVING OBJECTS

[75] Inventor: Shozo Yamano, Tokyo, Japan

[73] Assignee: Nikon Corporation, Tokyo, Japan

[21] Appl. No.: 366,387

[22] Filed: Dec. 29, 1994

Related U.S. Application Data

[63] Continuation of Ser. No. 95,019, Jul. 23, 1993, abandoned.

[30] Foreign Application Priority Data

Aug. 18, 1992 [JP] Japan ................................ 4-219094
Aug. 18, 1992 [JP] Japan ................................ 4-219449

[51] Int. Cl.⁶ ............................................ G03B 13/36
[52] U.S. Cl. ................................ 250/201.2; 354/402
[58] Field of Search ..................... 250/201.2, 201.8; 354/402, 406–408, 266

[56] References Cited

U.S. PATENT DOCUMENTS 5,060,002 10/1991 Ohnuki et al. ................. 354/402
5,177,525 1/1993 Ogasawara ................. 250/201.2
5,270,763 12/1993 Ogasawara ................. 354/402

*Primary Examiner*—Stephone B. Allen
*Attorney, Agent, or Firm*—Shapiro and Shapiro

[57] ABSTRACT

An automatic focusing apparatus comprises an object speed calculating device for calculating a moving speed of object image plane, based on a defocus amount detected by a focus detecting device and a detection time interval measured by a time counting device, a speed control device for outputting to a driving device a speed command value for equalizing an image plane moving speed of photo-taking lens to the moving speed of object image plane, a speed correcting device for correcting the speed command value output from the speed control device in accordance with the defocus amount detected by the focus detecting device, and the driving device for driving the photo-taking lens in accordance with the speed command value, whereby the photo-taking lens smoothly pursues the moving object in the in-focus state.

4 Claims, 13 Drawing Sheets

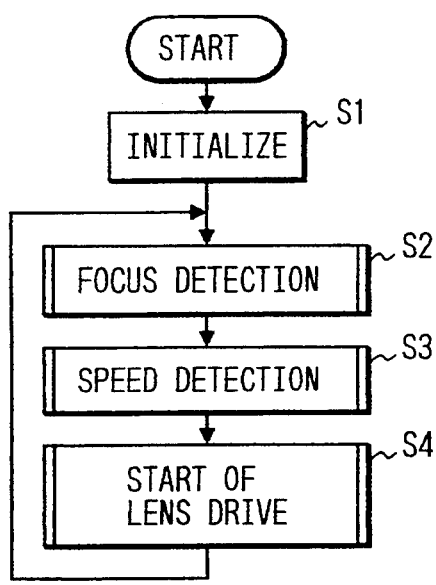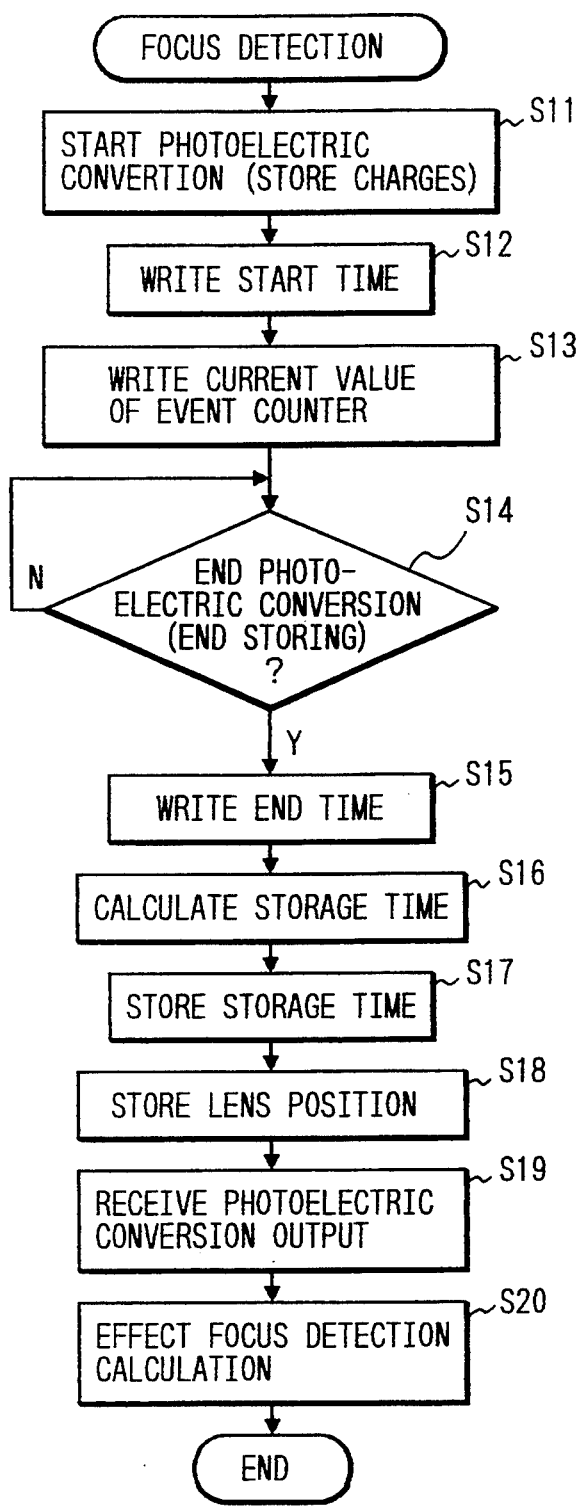

AUTOMATIC FOCUSING APPARATUS FOR MOVING OBJECTS

This is a continuation of application Ser. No. 08/095,019 filed Jul. 23, 1993, now abandoned.

BACKGROUND OF THE INVENTION

1. Field of the Invention

The present invention relates to an automatic focusing apparatus which drive-controls a photo-taking lens to make it pursue a moving object.

2. Related Background Art

There is known an automatic focusing apparatus which drive-controls a photo-taking lens to make it pursue a moving object. In the apparatus of this type a defocus amount of focus detection result is detected at a certain time interval for securing a charge storage time of sensor and a focus detection calculation time, and a moving speed of object is calculated based on current and past defocus amounts and the detection time interval between them. A drive amount of photo-taking lens is obtained by correcting the defocus amount with the thus calculated moving speed, and the calculated drive amount is set for a servo motor to drive-control the photo-taking lens.

In the conventional automatic focusing apparatus, however, the defocus amount and the moving speed of object are calculated at the time interval depending upon the charge storage time and the focus detection calculation time, and the drive amount is set for the servo motor in an intermittent manner. The intermittent input of drive amount causes a jerky motion of photo-taking lens, which in turn results in jerky movement of object image in a finder to raise a problem of bad feeling in use.

Especially, this phenomenon is outstanding in the so-called intermittent servo method in which the photo-taking lens is not driven during the charge storage in sensor. The motion of photo-taking lens is smoother in the so-called overlap servo method in which the photo-taking lens is driven also during the charge storage than in the intermittent servo method, because a newly calculated drive amount is reset during the drive of photo-taking lens. However, if a servo target becomes closer before a next drive amount is set, the servo motor is decelerated on occasion to assure the stop accuracy. Such deceleration also causes the jerky motion of photo-taking lens, raising the same problem as above.

SUMMARY OF THE INVENTION

It is an object of the present invention to make a photo-taking lens smoothly pursuing a moving object in an in-focus state.

It is another object of the present invention to provide a focus detection apparatus which can make the motion of lens smooth when a moving object is detected and which can permit a sharp picture to be taken when exposure is performed with the moving object upon shutter release.

In a first aspect of the present invention, an automatic focusing apparatus comprises object speed calculating means for calculating a moving speed of object image plane based on a defocus amount detected by focus detecting means and on a detection time interval measured by time counting means, speed control means for outputting to drive means a speed command value for equalizing the image plane moving speed of photo-taking lens to the moving speed of object image plane, speed correcting means for correcting the speed command value output from the speed control means in dependence on the defocus amount detected by the focus detection means, and drive means for driving the photo-taking lens in accordance with the speed command value, whereby the photo-taking lens is driven to smoothly pursue the moving object in an in-focus state.

In a second aspect of the present invention, an automatic focusing apparatus achieves a smooth lens drive by driving a lens while a moving speed of lens is made coincident with an image plane moving speed of moving object. Upon a release operation after that, the lens drive is switched into a position control to attain the in-focus state at the time of exposure. For that, there are provided a speed control circuit for controlling the speed of lens such that the image plane moving speed of photo-taking lens is made coincident with the image plane speed of object when a movement of object is detected, and a position control circuit for controlling the position of photo-taking lens in the use of the image plane speed of object and the defocus amount to attain the in-focus state after a certain time lag, whereby the photo-taking lens is driven by the speed control circuit before the release but by the position control circuit after the release.

BRIEF DESCRIPTION OF THE DRAWINGS

FIG. 5 is a flowchart to show a focusing main program;

FIG. 6 is a flowchart to show a focus detection routine;

DESCRIPTION OF THE PREFERRED EMBODIMENTS

The present invention will be described in detail with reference to the accompanying drawings.

Figure 1:
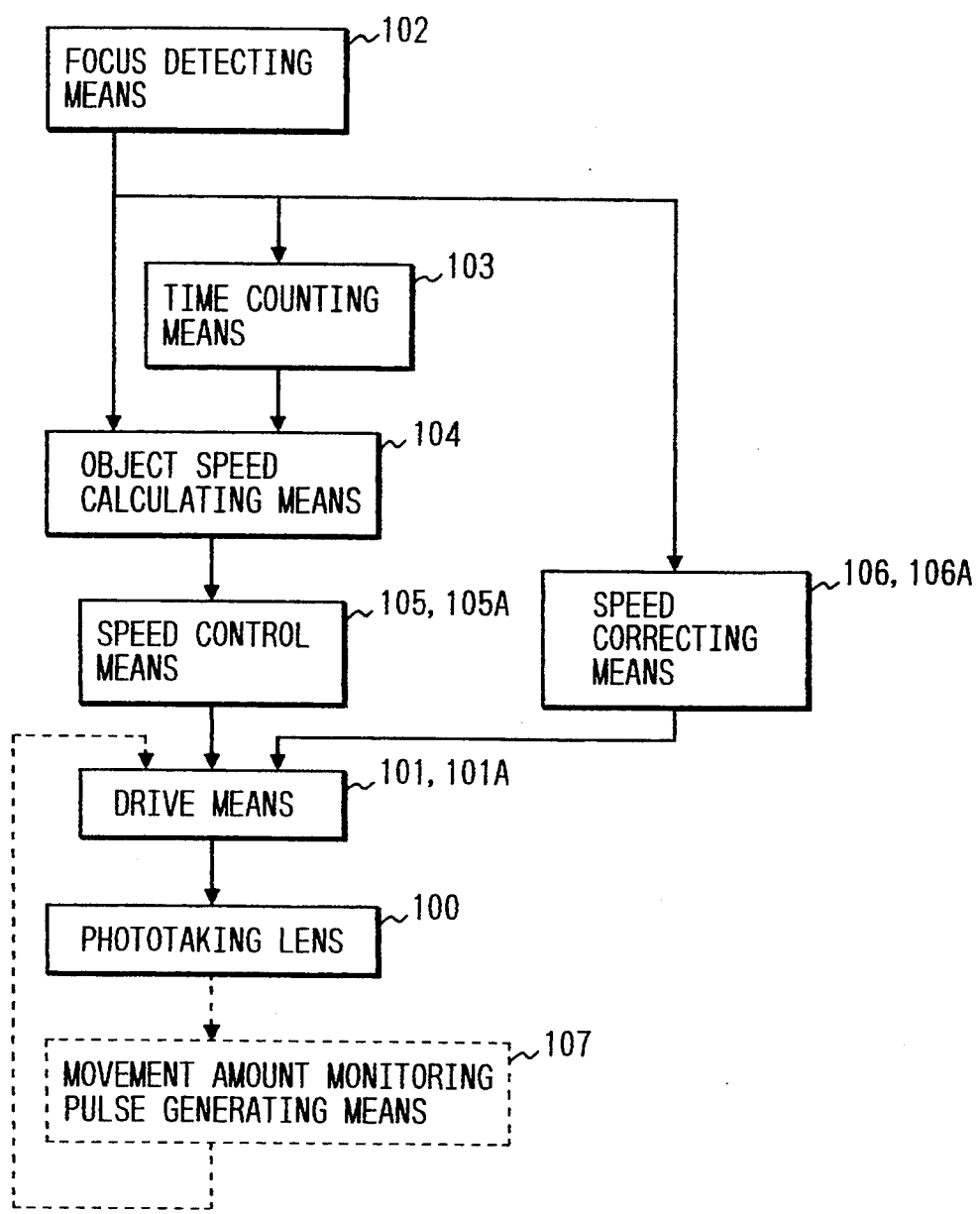
FIG. 1 is a block diagram to show the structure of the present invention.

Referring to FIG. 1 to illustrate the present invention, an automatic focusing apparatus of the invention comprises drive means 101 for driving a photo-taking lens 100 in accordance with a speed command value, focus detecting means 102 for repetitively detecting a defocus amount representing a focusing state of the photo-taking lens 100, time counting means 103 for measuring a detection time interval for detection of the focus detecting means 102, object speed calculating means 104 for calculating a moving speed of object image plane, based on the defocus amount detected by the focus detecting means 102 and on the detection time interval measured by the time counting means 103, speed control means 105 for outputting to the drive means 101 a speed command value for equalizing an image plane moving speed of the photo-taking lens 100 to the moving speed of object image plane calculated by the object speed calculating means 104, and speed correcting means 106 for correcting the speed command value output from the speed control means 105 in accordance with the defocus amount detected by the focus detecting means 102.

The apparatus of the present invention comprises movement amount monitoring pulse generating means 107 for generating monitoring pulses depending upon a movement amount of the photo-taking lens 100, in which speed control means 105A calculates the number of generated photo-taking lens (100) movement amount monitoring pulses per unit time, based on the moving speed of object image plane calculated by the object speed calculating means 104, in which speed correcting means 106A calculates the number of generated photo-taking lens (100) movement amount monitoring pulses per unit time, based on the defocus amount detected by the focus detecting means 102, and in which the drive means 101A drives the photo-taking lens 100 while feeding back the monitoring pulses from the movement amount monitoring pulse generating means 107 to the speed command value to which the pulse numbers respectively calculated by the speed control means 105A and the speed correcting means 106A are added.

The drive speed of photo-taking lens 100 is controlled by outputting to the driving means 101 the speed command value for equalizing the image plane moving speed of photo-taking lens 100 to the moving speed of object image plane, and correcting the speed command value in dependence on the detected defocus amount.

Figure 2:
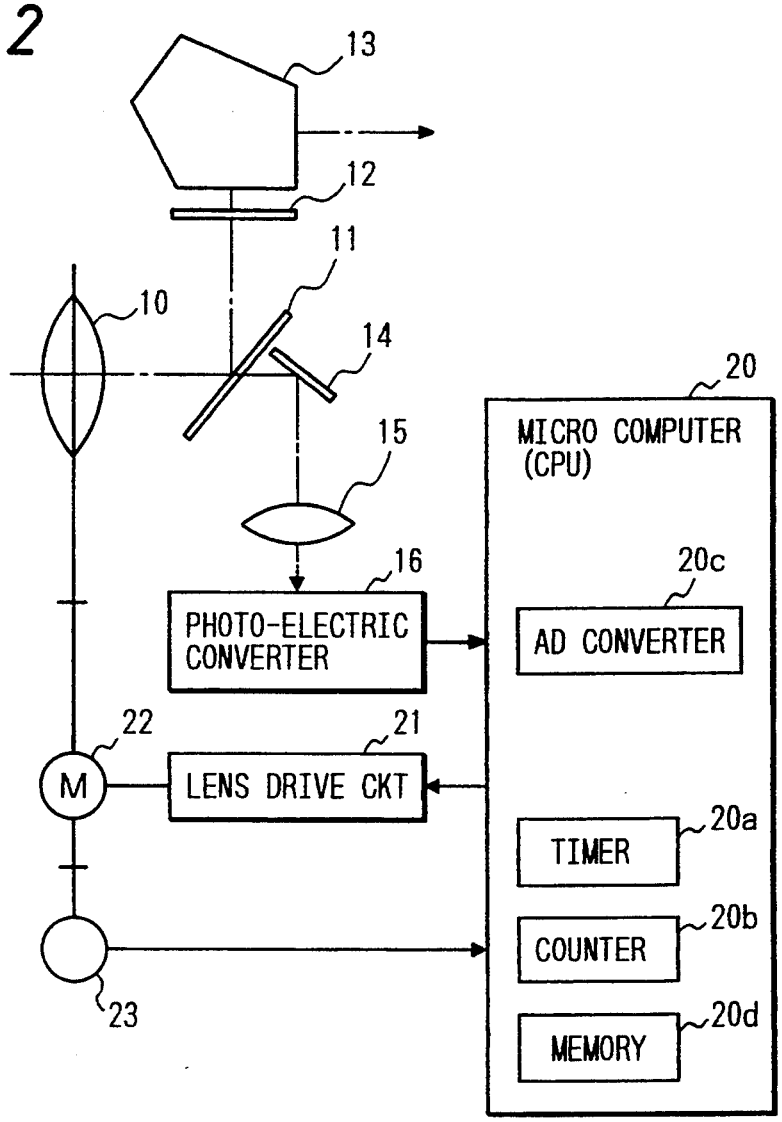
FIG. 2 is a block diagram to show the construction of the first embodiment of the present invention.

FIG. 2 shows the construction of the first embodiment according to the present invention. Beams from an object pass through a photo-taking lens 10 to reach a main mirror 11, and a portion thereof is reflected by the main mirror 11 to be guided onto a finder screen 12 so as to form an image of the object on the finder screen 12. This object image is observed through a pentaprism 13 by a photographer. Also, the other portion of beams from the object reaching the main mirror 11 passes through the main mirror 11 and then is reflected by a submirror 14 to be guided by a focus detection optical system 15 to a charge storage type photo-electric converter 16.

Figure 3:
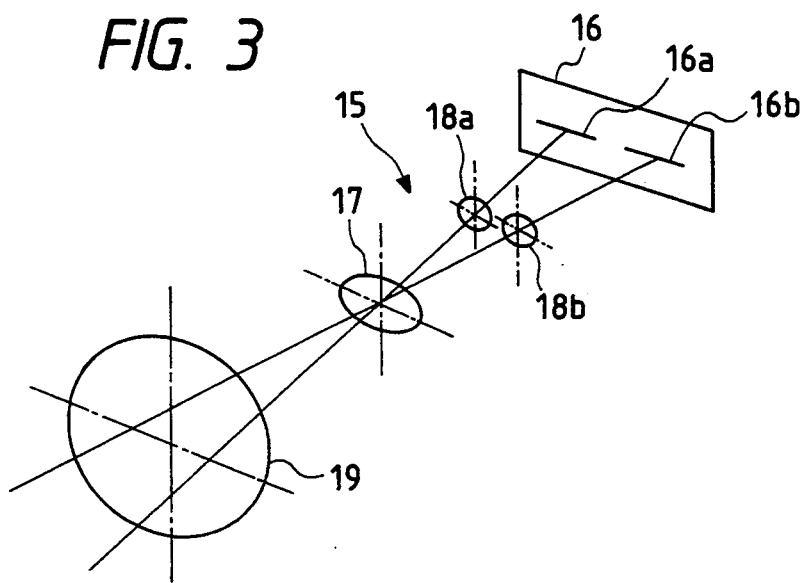
FIG. 3 is a drawing to show an example of construction of a focus detection optical system and a photo-electric converter.

FIG. 3 shows an example of construction of the focus detection optical system and the photo-electric converter. The focus detection optical system 15 is mainly composed of a condenser lens 17 and re-imaging lenses 18a, 18b, through which a pair of beams having passed through two different regions on an exit pupil plane 19 of the photo-taking lens 10 are guided to a pair of photo receiving portions 16a, 16b on the charge storage type photo-electric converter 16. Each of the photo receiving portions 16a, 16b is composed of a plurality of photo-electric conversion elements, and each of the elements outputs an electric signal according to a light intensity of object image formed on the photo receiving portion 16a, 16b.

A microcomputer (as will be referred to as CPU) 20 is provided with peripheral components such as a timer 20a for time counting, an event counter 20b, an A-D converter 20c, and a memory 20d, to execute various calculations and sequence control of camera. A lens drive circuit 21 drives a lens motor 22 in accordance with a lens drive amount and a drive direction calculated by the CPU 20 to move the photo-taking lens 10. A pulse generator 23 is driven in synchronism with the lens motor 22 and generates a pulse signal for each predetermined drive amount of the lens motor 22. The pulse signals are counted by the event counter 20b in the CPU 20.

Figure 4:
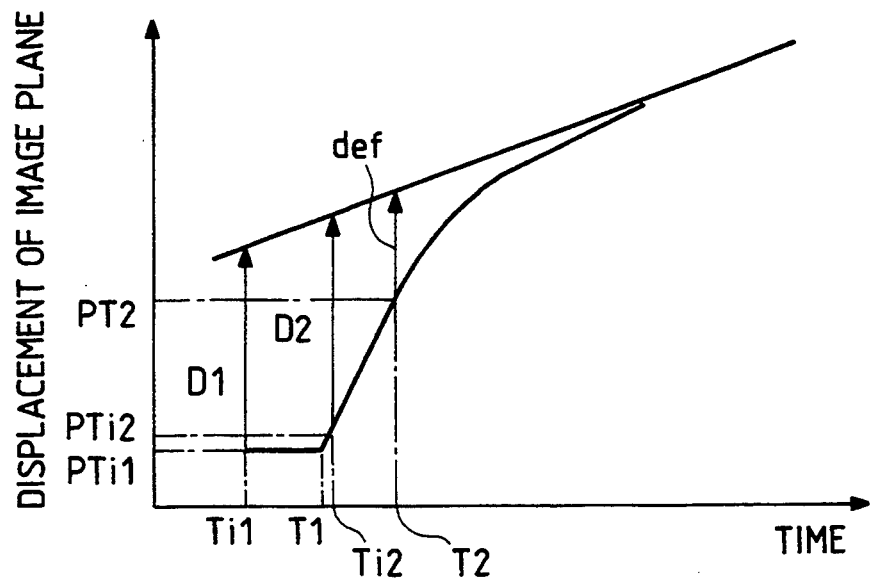
FIG. 4 is a drawing to illustrate the principle of operation for making a photo-taking lens pursuing a moving object.

Now described is the principle of operation of the automatic focusing apparatus according to the present invention. FIG. 4 shows a movement X of moving object and a movement L of photo-taking lens 10, in which the horizontal axis represents the time and the vertical axis a displacement of image plane in the direction of optical axis of the photo-taking lens 10.

Storage of the charge storage type photo-electric converter 16 is carried out at a stop lens position PTi1 and at a time Ti1, and a defocus amount D1 of the object is obtained at a time T1 after a charge storage time, a transfer time of storing charge, and a focus detection calculation time. Since it cannot be judged at this time whether the object is moving, a drive control of the lens motor 22 is started with a drive amount of the defocus amount D1. After the photo-taking lens 10 is started driving, next charge storage of the photo-electric converter 16 is carried out at a lens position PTi2 and at a time Ti2 for next focus detection. A defocus amount D2 of object is obtained at a time T2 in the same manner as above. A moving speed of object image plane is calculated based on these two defocus amounts. Defining as D1ns a change in defocus amount (PTi2−PTi1) when the photo-taking lens 10 moves between the time Ti1 and the time Ti2, a moving speed S of object image plane may be calculated by the following equation.

$$S = (D2 - D1 - D1ns)/(Ti2 - Ti1) \quad (1)$$

Since the moving speed S of object image plane is now calculated, the photo-taking lens 10 is drive-controlled after the time T2 such that the image plane moving speed of the photo-taking lens 10 is equalized to the thus calculated moving speed of object. Actually, there is a defocus amount def present at the time T2. If the position of photo-taking lens 10 at the time T2 is PT2, the defocus amount def at the time T2 is expressed by the following equation.

$$def = \{D2 - (PT2 - PTi2)\} + (T2 - Ti2) \times S \quad (2)$$

In Equation (2) the first term in the right side represents an amount after correction of the defocus amount D2 at the time Ti2 with a change amount due to the movement of the lens itself, and the second term an object image plane movement amount between the time Ti2 and the time T2.

As long as the defocus amount def is present, the defocus state is kept even if the photo-taking lens 10 is driven at the same image plane speed S as the moving object. Accordingly, the defocus amount def must be introduced into a drive control amount. If f (def) represents a control amount corresponding to the defocus amount def, f (def) will be an acceleration component according to the defocus amount. The actual introduction of this control amount f (def) into the control system is possible by various methods. In case of employing a control method as described later in which monitoring pulses generated according to a drive amount of the lens motor 22 are fed back, a response is slow with a low contribution of the control amount f (def), and therefore the defocus amount def cannot be readily converged. In contrast, with a too high contribution over drive and control vibration become outstanding. In the present embodiment, the control amount f (def) is set as the following nonlinear function, considering the focus detection time interval (normally about 50 ms at shortest) and the detection time interval of feedback monitoring pulses for speed control. Here, the detection time interval of feedback monitoring pulses is set shorter than the focus detection time interval.

$$f(def) = K \times \log(def) \quad (3)$$

Further, taking it into consideration that the present embodiment employs the pulse base feedback for speed control and that a ratio between the image plane movement amount and pulses varies depending upon interchangeable lenses, it is more convenient to convert the defocus amount into a number of drive pulses (n) and to arrange above Equation (3) therewith. Accordingly, above Equation (3) is rewritten as follows.

$$f(def) = K \times \log(n), \text{ where } n \geq 1 \quad (4)$$

The lens motor 22 is drive-controlled using the thus calculated control speed as described below, as a control target amount Q.

$$S + f(def) \quad (5)$$

FIG. 5 shows the main program executed in the CPU 20. The operation of the embodiment is explained below with reference to this flowchart.

Figure 8:
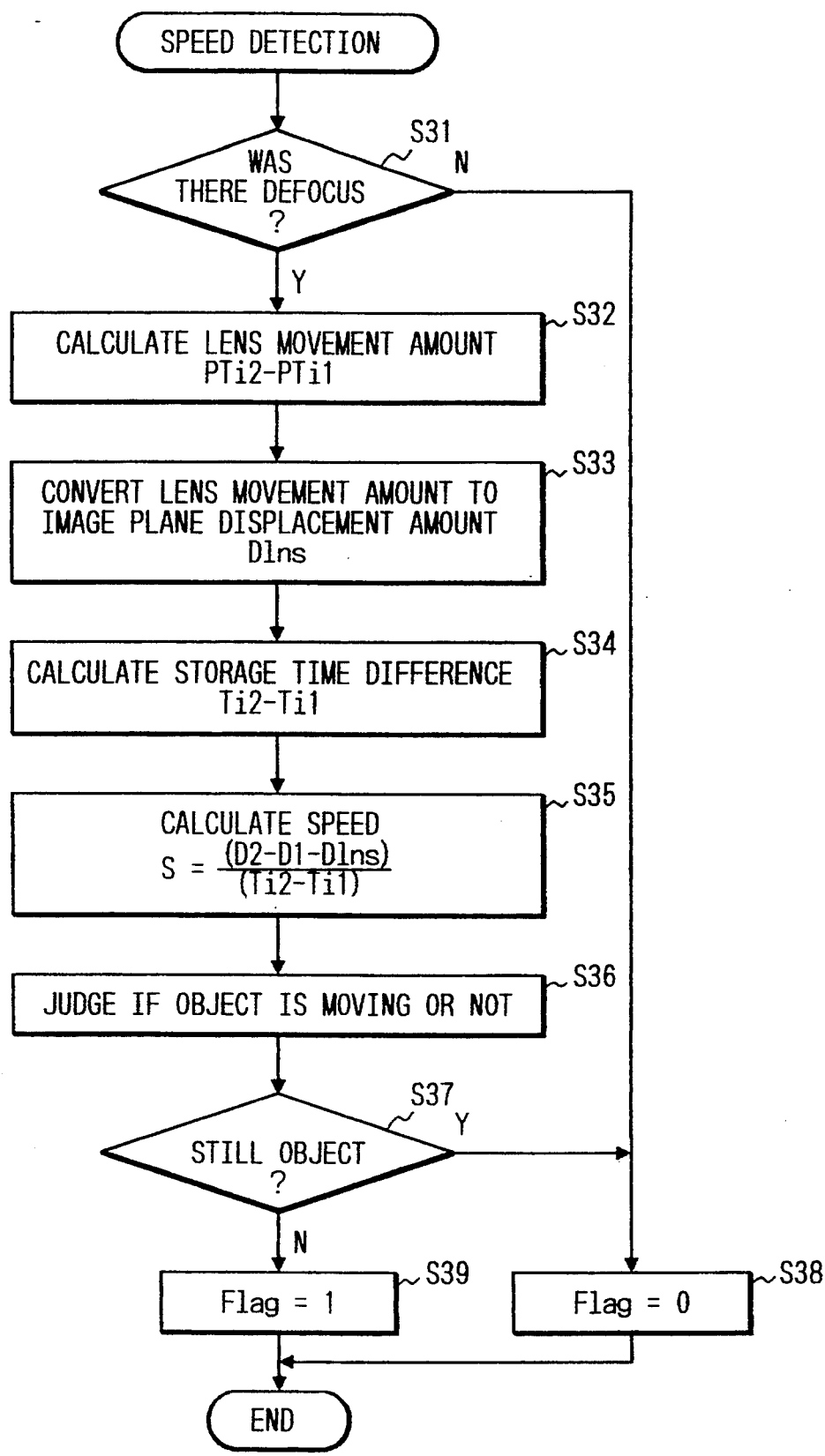
FIG. 8 is a flowchart to show a speed detection routine.
Figure 9:
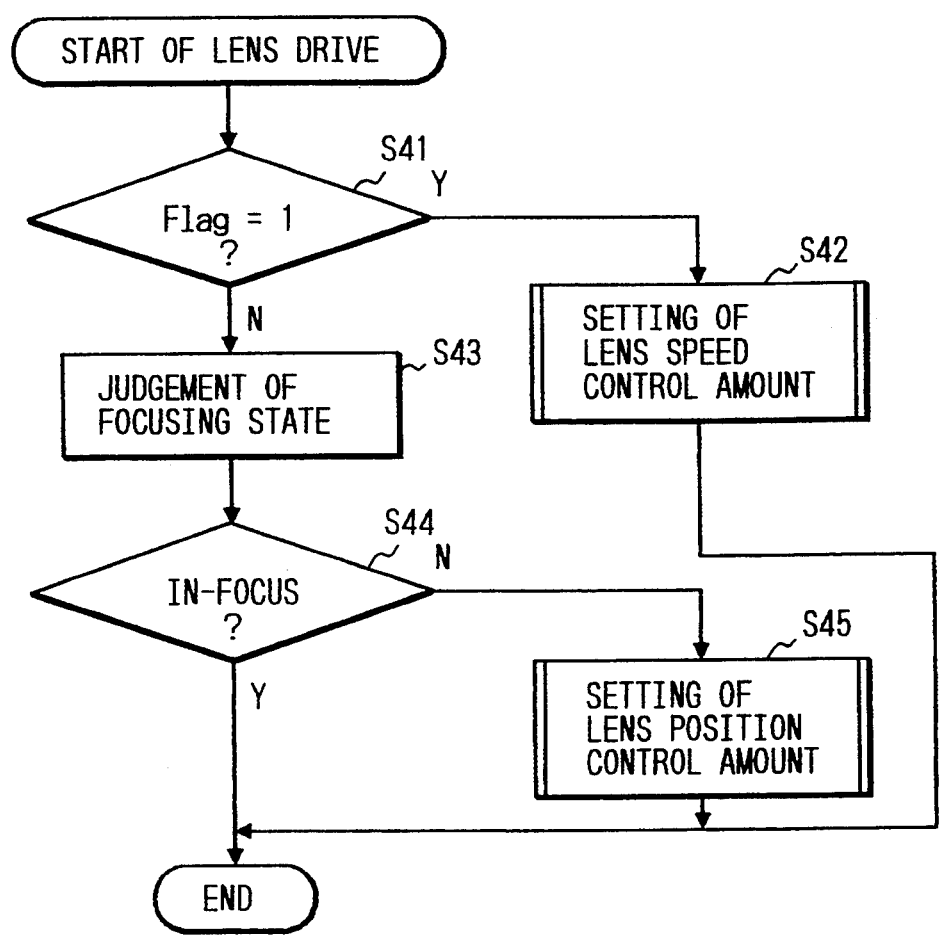
FIG. 9 is a flowchart to show a lens drive start routine.

The CPU 20 starts executing this control program when the unrepresented main switch of camera is switched on. First at Step S1 the timer 20a, the event counter 20b, the A-D converter 20c, and the memory 20d are initialized, and at Step S2 a focus detection routine as shown in FIG. 6 is carried out to calculate a defocus amount. Further, at Step S3 a speed detection routine as shown in FIG. 8 is carried out to calculate a moving speed of object image plane, and at next Step S4 a lens drive start routine as shown in FIG. 9 is carried out to drive the photo-taking lens 10.

A focus detection operation is now described with the focus detection routine as shown in FIG. 6. At Step S11 the charge storage of photo-electric converter 16 is started, and at next Step S12 a start time of the charge storage is written from the built-in clock into the memory 20d. The smallest time unit is 1 ms. Then at Step S13 a current value of the event counter 20b counting the number of generated pulses by the pulse generator 23 is written into the memory 20d. This current value of event counter 20b is a lens position at the start time of storage. At Step S14 it is judged whether the charge storage of photo-electric converter 16 is completed, that is, whether a storage time preliminarily set to optimize the charge storage level elapsed. If the storage time elapsed then the flow goes to Step S15 to write an end time of charge storage from the built-in clock into the memory 20d. At Step S16 a time at the middle point in charge storage period is calculated as a charge storage time Ti1, and at next Step S17 the time is stored in the memory 20d. In case that the charge storage time is sufficiently short, the charge start time may be employed as the storage time Ti1.

Although the photo-taking lens 10 is driven in the charge storage period, it is here assumed that the lens position is constant in the storage period for brevity of calculation. Under the assumption the lens position is calculated at Step S18 by the following procedure.

Figure 7:
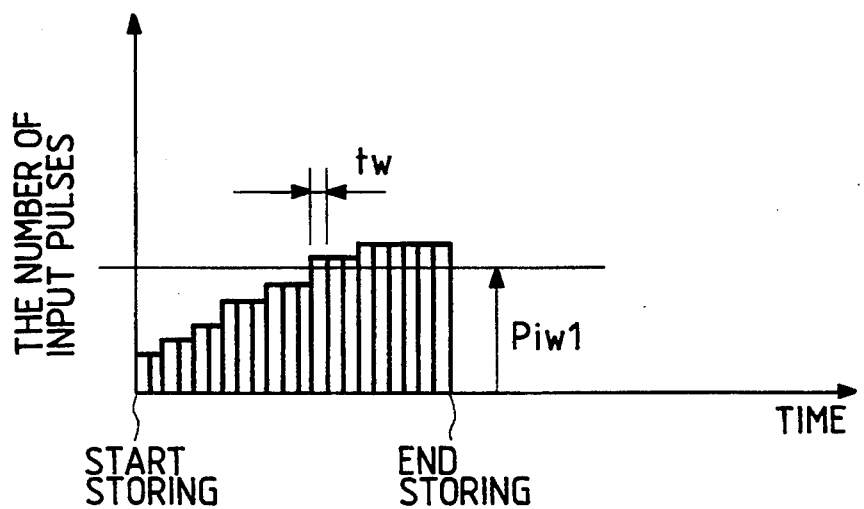
FIG. 7 is a drawing to illustrate the procedure for determining a lens position during charge storage.

As shown in FIG. 7, the number of generated pulses by the pulse generator 23 is counted in each fully short time interval tw for example of 500 μs from the storage start time, based on the count value of event counter 20b. An area of each period is obtained with two sides of time tw and counted pulse number in each period, and a sum of thus obtained areas is divided by the charge storage time to obtain an equivalent input pulse number Piw1. This value represents a hypothetical lens position after converted into pulse number, if a start point is at the storage start time. The thus calculated hypothetical lens position is added to the lens position at the storage start time stored in the memory 20d, and the result is stored in the memory 20d as a lens position PTi1 in the charge storage period. In case that the charge storage time is sufficiently short, the lens position at the charge start time may be employed as the lens position PTi1 in the storage period.

At Step S19 the CPU receives the focus detection signal from the photo-electric converter 16 through the A-D converter 20c, and at next Step S20 it performs the focus detection calculation based on those signals.

The calculation process of moving speed of object image plane is next explained with the speed detection routine as shown in FIG. 8. At Step S31 it is judged whether a defocus amount was detected in the past by focus detection. If a defocus amount is detected then the flow goes to Step S32, whereas if otherwise the flow goes to Step S38, because the moving speed of object image plane cannot be calculated. At Step S32 a lens movement amount (PTi2−PTi1) is calculated with the previous and current lens positions stored in the memory 20d in the focus detection routine as shown in FIG. 6, and at next Step S33 the calculated lens movement amount (PTi2−PTi1) is converted into an image plane displacement amount D1ns. This conversion may be effected by calculating a defocus amount from pulse number with Equation (6) as described below.

At Step S34 a difference between the previous and current charge storage times, (Ti2−Ti1), stored in the memory 20d in the focus detection routine as shown in FIG. 6 is obtained, and at Step S35 the image plane moving speed S is calculated by Equation (1) as described above. At Step S36 a motion judgement of object is carried out. This motion judgement cannot be done simply with the image plane moving speed S thus calculated. For example, a dispersion of focus detection errors in detection speed is wide in a very low speed zone, so that the calculation accuracy of speed is lowered. Thus, the motion judgement must be conducted totally considering for example whether the calculated speed exceeds a predetermined threshold value, or whether the sign of image plane moving speed is identical to that of previous speed. At Step S37 it is judged by the motion judgement whether the object is still. With judgement of a still object the flow goes to Step S38 to clear a moving object flag Flag, whereas with judgement of a moving object the flow goes to Step S39 to set the flag Flag.

Figure 12:
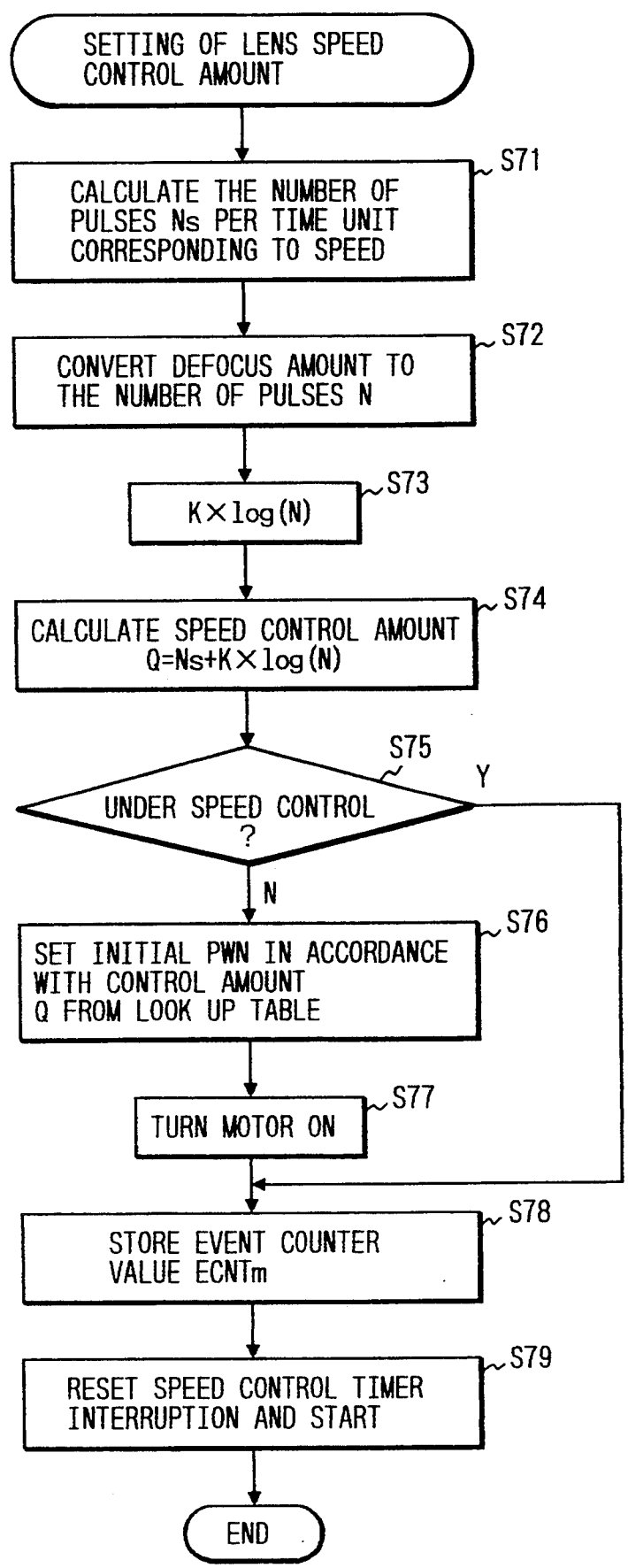
FIG. 12 is a flowchart to show a lens speed control amount setting routine.

The lens drive operation is next described with the lens drive start routine as shown in FIG. 9. At Step S41 it is judged whether the moving object flag Flag is set. If the moving object flag Flag is set the flow goes to Step S42; otherwise, to Step S43. At Step S42 a lens speed control amount setting routine as shown in FIG. 12 is executed and then the flow returns to the main program. On the other hand, at Step S43 a judgement of focus state of the photo-taking lens 10 is carried out, and at next Step S44 it is judged whether the judgement result shows that the lens is in focus. If the photo-taking lens 10 is in focus then the flow returns to the main program, whereas if it is out of focus a lens position control amount setting routine as shown in FIG. 10 is executed and then the flow returns to the main program.

Figure 10:
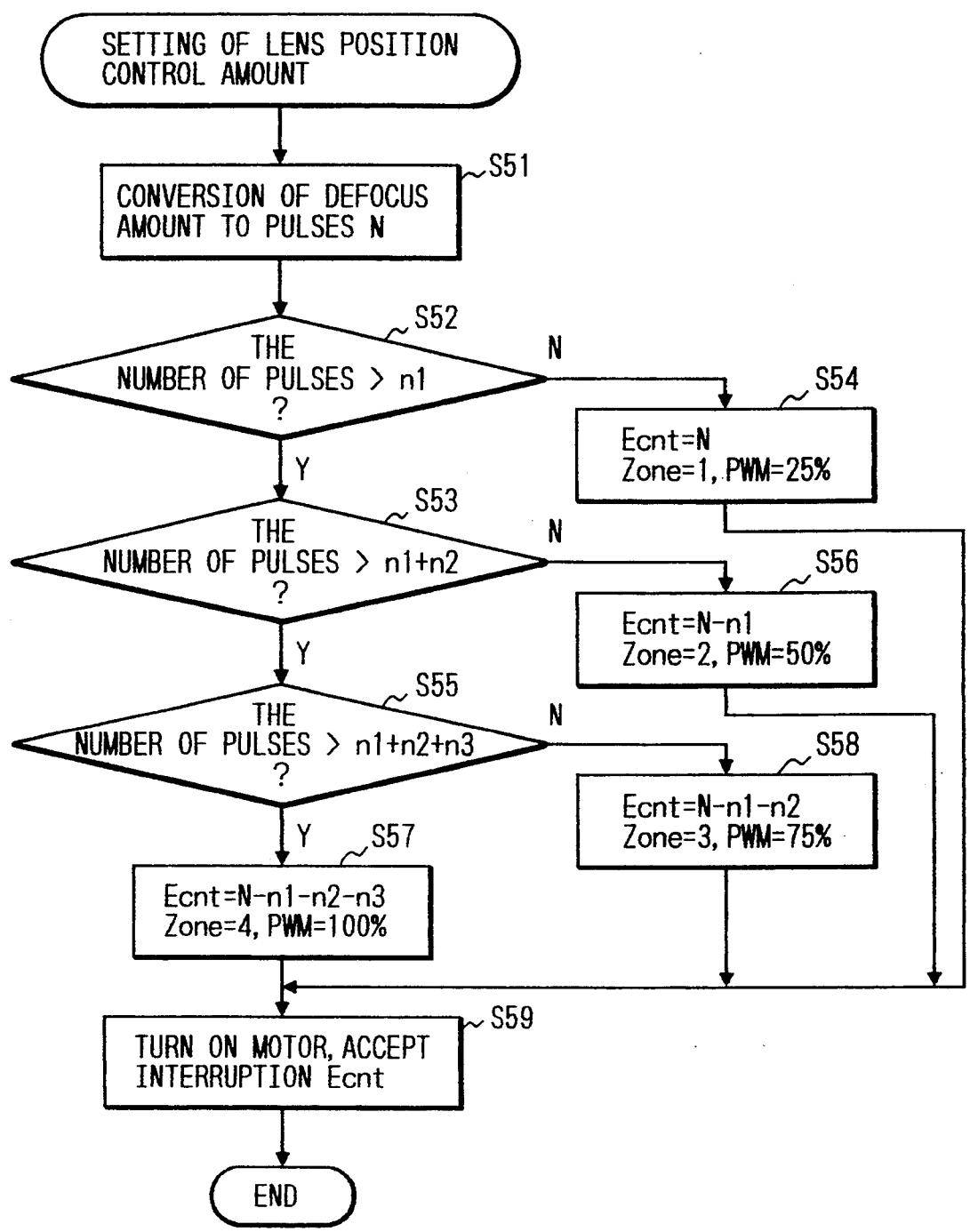
FIG. 10 is a flowchart to show a lens position control amount setting routine.

The lens position control amount setting operation is next explained with the lens position control amount setting routine as shown in FIG. 10. At Step S51 the defocus amount is converted into a drive pulse number N. This defocus amount is an amount obtained by correcting the defocus amount of focus detection calculation result by the movement amount of photo-taking lens 10, which is an amount to be driven at this calculation point. The drive pulse number N is calculated based on a relation between the image plane displacement amount of the photo-taking lens 10 and a rotation amount of the lens motor 22 and on a relation between the rotation amount of the lens motor 22 and the number of generated pulses by the pulse generator 23. For example, if a number of rotations of the lens motor 22 per image plane displacement amount 1 mm is K1 (rev/mm) and if a number of monitoring pulses per rotation of lens motor 22 is Kb (/rev), the pulse number N for defocus amount def may be obtained by the following equation.

$$N = def \times K1 \times Kb \qquad (6)$$

Zones are set depending upon the thus calculated pulse number N. A plurality of zones are provided before the stop position to improve the stop accuracy so that the lens motor 22 is decelerated as passing the zones. At Step S52 it is judged whether the pulse number N to be driven is greater than a pulse number n1. If greater the flow goes to Step S53, whereas if smaller to Step S54. At Step S54 Zone 1 is set such that a PWM duty of drive voltage which is applied to the lens motor 22 is set to 25% and that an event count interruption for generating an interruption when a predetermined number of pulses are input is set to N, and then the flow goes to Step S59.

If the pulse number N to be driven is greater than the pulse number n1, it is judged at Step S53 whether the drive pulse number N is greater than the pulse number (n1+n2). If greater then the flow goes to Step S55, while if smaller to Step S56. At Step S56 Zone 2 is set such that the PWM duty is set to 50% and the event count interruption to (N−n1), and then the flow goes to Step S59.

If the drive pulse number N is greater than the pulse number (n1+n2), it is judged at Step S55 whether the drive pulse number N is greater than the pulse number (n1+n2+n3). If greater then the flow goes to Step S57, whereas if smaller to Step S58. At Step S58 Zone 3 is set such that the PWM duty is set to 75% and the event count interruption to (N−n1−n2), and then the flow goes to Step S59.

If the drive pulse number N is greater than the pulse number (n1+n2+n3), Zone 4 is set at Step S57 such that the PWM duty is set to 100% and the event count interruption to (N−n1−n2−n3), and then the flow goes to Step S59.

At Step S59 the lens motor 22 is driven with PWM duty set in either of the zones by the lens driving circuit 21, and the event count interruption is accepted.

For example, if the pulse number n1 is 20, n2 is 30, and n3 is 40, and if the drive pulse number N is 58, the lens motor 22 is first driven in Zone 3 with PWM duty of 75% before eight monitoring pulses are counted after the drive start; then the lens motor 22 is driven in Zone 2 with PWM duty of 50% before thirty monitoring pulses are next counted; finally the lens motor 22 is driven in Zone 1 with PWM duty of 25% before twenty monitoring pulses are counted.

Figure 11:
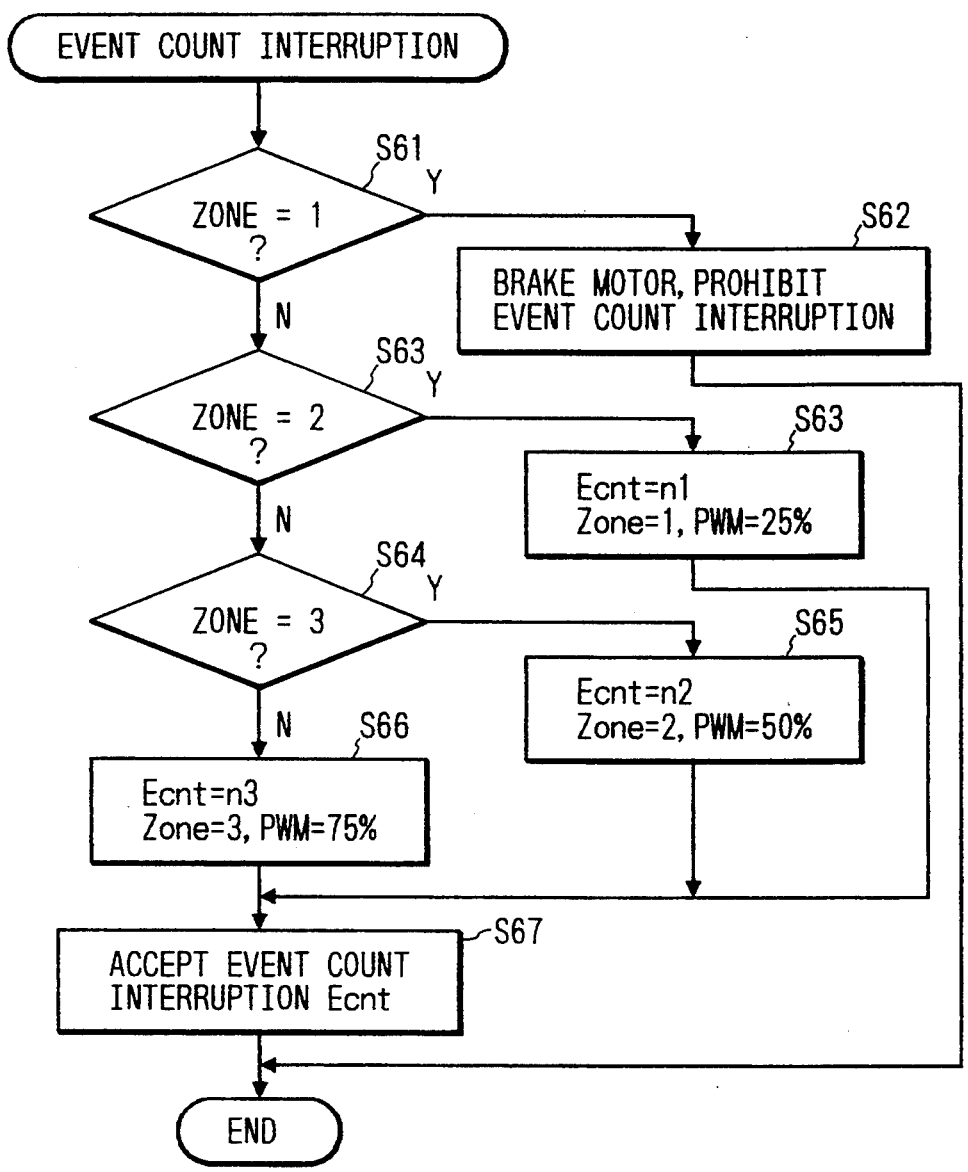
FIG. 11 is a flowchart to show an event count interruption routine.

FIG. 11 shows the event count interruption routine. After monitoring pulses of the number, corresponding to the pulse number N set for the event count interruption in the lens drive start setting routine as shown in FIG. 10 are counted, the CPU 20 starts executing this interruption routine. It is first judged at Step S61 whether the set zone is Zone 1. If Zone 1 then the flow goes to Step S62; otherwise to Step S63. At Step S62 the drive of lens motor 22 is completed in Zone 1 as it is sufficiently decelerated, so that the lens motor 22 is stopped by breaking it and the event count interruption is prohibited to stop interruption.

At Step S63 it is judged whether the set zone is Zone 2. If Zone 2 then the flow goes to Step S63; otherwise to Step S64. At Step S63 Zone is set to 1 while the event count interruption is set to the drive pulse number N=n1 and the PWM duty to 25% in Zone 1, and then the flow goes to Step S67.

If the zone is not Zone 2, it is then judged at Step S64 whether the zone is Zone 3. If Zone 3 then the flow goes to Step S65; otherwise to Step S66. At Step S65 Zone is set to 2 while the event count interruption is set to the drive pulse number N=n2 and the PWM duty to 50% in Zone 2, and then the flow goes to Step S67.

If the zone is not Zone 3, it is Zone 4. Then, at Step S66 Zone is set to 3 while the event count interruption is set to the drive pulse number N=n3 and the PWM duty to 75% in Zone 3, and then the flow goes to Step S67.

At Step S67 the event count interruption is accepted and then the interruption routine is ended.

FIG. 12 shows a lens speed control amount processing routine. At Step S71 a control pulse number Ns per unit time is calculated. The moving speed S of object image plane has already been calculated in the speed detection routine as shown in FIG. 8. This speed represents a defocus amount per unit time 1 ms. If a detection time duration of feedback monitoring pulses for speed control is for example 10 ms, the number of pulses to be input in 10 ms is calculated.

If the rotation number of lens motor 22 per unit image plane displacement amount 1 mm is K1 (rev/mm) and if the number of generated monitoring pulses per rotation of lens motor 22 is Kb (/rev), a target pulse number Ns per control time for defocus amount def may be calculated by the following equation.

$$Ns = def \times K1 \times Kb \times 10 \qquad (7)$$

At next Step S72 the defocus amount at this calculation time is calculated using Equation (2), and it is converted into the pulse number Ns by above Equation (7). At next Step S73 an acceleration correction amount is calculated by Equation (4), based on the pulse number Ns thus converted. At Step S74 a control amount Q is calculated based on the target pulse number corresponding to the target speed, and the acceleration correction amount. At Step S75 it is judged whether the speed control is already under operation. If it is in progress then the flow skips Steps S76–S77. At Step S76 an initial PWM duty is read according to the control amount Q with reference to a look-up table of PWM duty preliminarily set with control amount Q. At Step S77 the lens motor 22 is drive-controlled with the set PWM duty by the lens driving circuit 21. At Step S78 a count value of event counter 20b at this moment is stored as ECNTm in the memory 20d, and at next Step S79 the speed control timer interruption is reset and started, for example setting to 10 ms.

Figure 13:
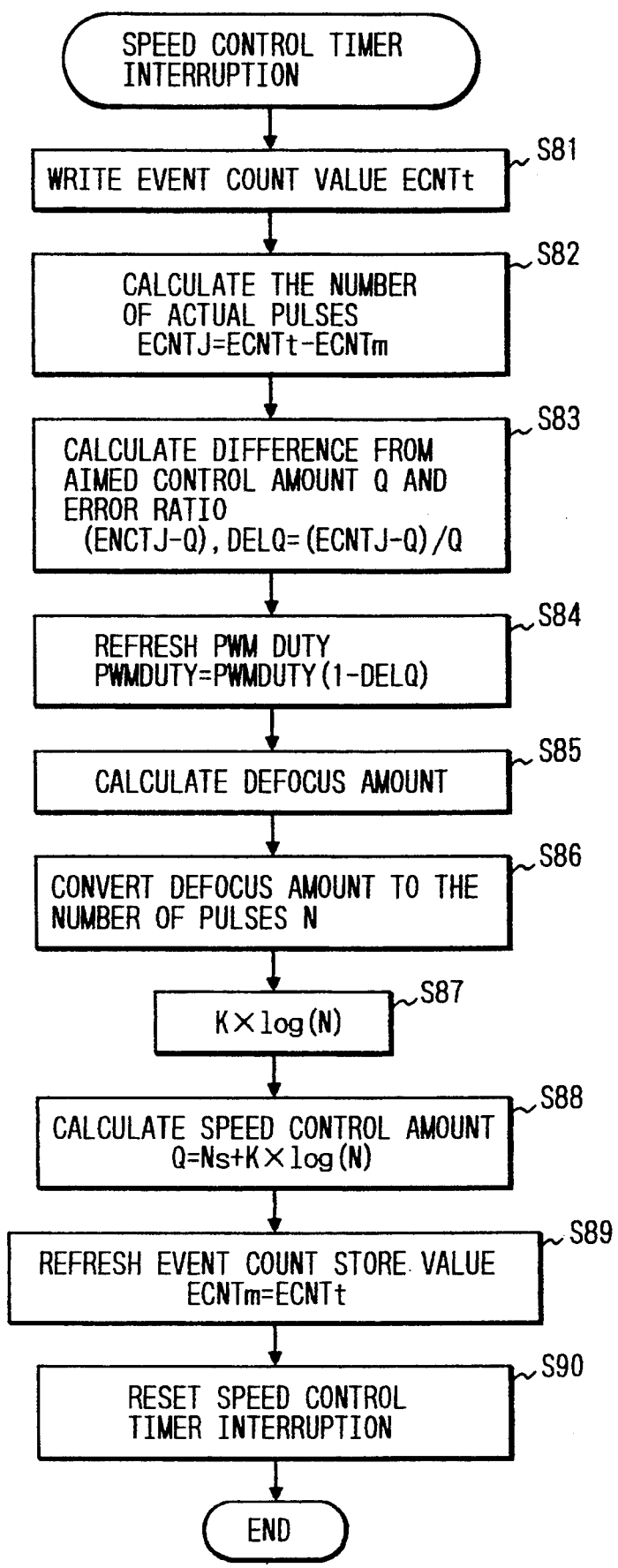
FIG. 13 is a flowchart to show a speed control timer interruption routine.

FIG. 13 shows a speed control timer interruption routine. This speed control timer interruption appears after the time set in the speed control amount setting routine as shown in FIG. 12, whereby the CPU 20 starts the execution of speed control timer interruption routine.

At Step S81 a count value ECNTt of event counter 20b is written, and at next Step S82 a difference is calculated between the count value ECNTt and the count value ECNTm stored in the memory 20d. That is, an actual pulse number ECNTJ input in 10 ms is calculated. At Step S83 a difference (ECNTJ−Q) is calculated between the calculated actual pulse number ECNTJ and the previously calculated target control amount Q, and an error rate DELQ is then calculated by the following equation.

$$DELQ = (ECNTJ - Q)/Q \qquad (8)$$

At next Step S84 the PWM duty is refreshed with the calculated error rate DELQ. Namely, $$(PWM \text{ duty}) = (PWM \text{ duty}) \times (1 - DELQ) \qquad (9).$$

At Step S85 a defocus amount at the time of speed control timer interruption is calculated by the following equation.

$$def = \{D2 - (PT2' - PT2)\} + (T2' - T2) \times S \qquad (10)$$

PT2' and T2' in the above equation correspond to PT2 and T2 in Equation (2), respectively. The calculated defocus amount is then converted into a pulse number N at Step S86, and an acceleration component is further calculated therewith by Equation (4) at Step S87. Then at Step S88 a target control amount Q for next speed control timer interruption is calculated by the following equation.

$$Q = Ns + K \times \log(N) \qquad (11)$$

At Step S89 the stored value ECNTm of event count value is refreshed with ECNTt, and at next Step S90 the speed control timer is reset and then started.

The PWM duty control (speed control) by this speed control timer interruption is repeated several times before latest speed and defocus amount are detected with a new focus detection result, in each of which the feedback is effected for the photo-taking lens 10 to pursue the trace of object.

As described, the speed command value, that is, the number Ns of target monitoring pulses to be generated per unit time, is calculated based on the calculated moving speed of object image plane, the detected defocus amount is converted into the monitoring pulse number N, the converted value N is then subjected to the logarithmic compression, and the correction amount of speed command value, that is, the acceleration correction amount {K×log (N)}, is then calculated. Then, the speed command value Q is calculated by adding the acceleration correction amount to the target monitoring pulse generation number, and the speed of photo-taking lens is controlled by feeding back monitoring pulses to the speed command value Q, so that the photo-taking lens may pursue the moving object in a smooth manner while being in focus thereon, whereby a photographer can observe through the finder that the in-focus image of moving object is smoothly moving.

In the construction of the embodiment as described, the focus detection optical system 15, the photo-electric converter 16 and the CPU 20 correspond to the focus detection means, the lens driving circuit 20 and the lens motor 22 to the driving means, the pulse generator 23 to the movement amount monitoring pulse generating means, and the CPU 20 to the time counting means, the object speed calculating means, the speed control means and the speed correcting means.

According to the present embodiment as described, the speed command value is output for making the image plane moving speed of photo-taking lens equal to the moving speed of object image plane, and the drive speed of photo-taking lens is controlled by correcting the speed command value in accordance with the detected defocus amount, so that the photo-taking lens may be driven to pursue the moving object in a smooth manner while being in focus thereon, whereby a photographer can observe through the finder that the in-focus image of moving object is smoothly moving.

Figure 14:
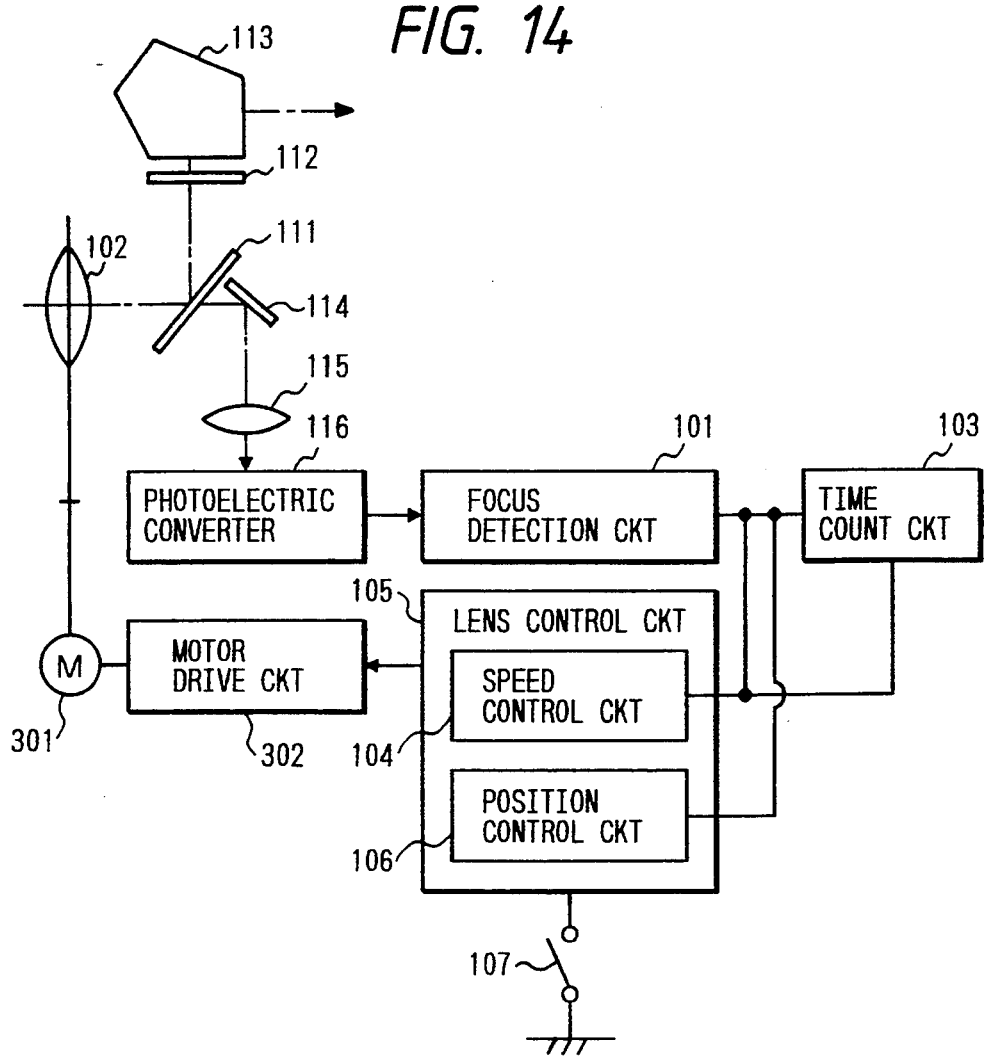
FIG. 14 is a block diagram to show the construction of the second embodiment.

FIG. 14 is a block diagram to show the second embodiment according to the present invention. Beams reflected by a submirror 114 after passed through a photo-taking lens 102 and a half mirror 111 are photo-electrically converted by a photo-electric converter 116, and a focused state thereof through the photo-taking lens 102 is then detected by a focus detection circuit 101 by a conventional procedure. A time count circuit 103 measures a time interval between repetitive detections of defocus amount. A lens control circuit 105 has a speed detection circuit 104 and a position detection circuit 106 switched with a signal from a release switch 107 to perform the lens control. A motor drive circuit 302 is controlled with a signal from either one of the speed detection circuit 104 and the position detection circuit 106, and the photo-taking lens 102 is driven by a motor 301. Beams reflected by the half mirror 111 go through a diffuser 112 and a pentaprism 113 into a finder.

Figure 15:
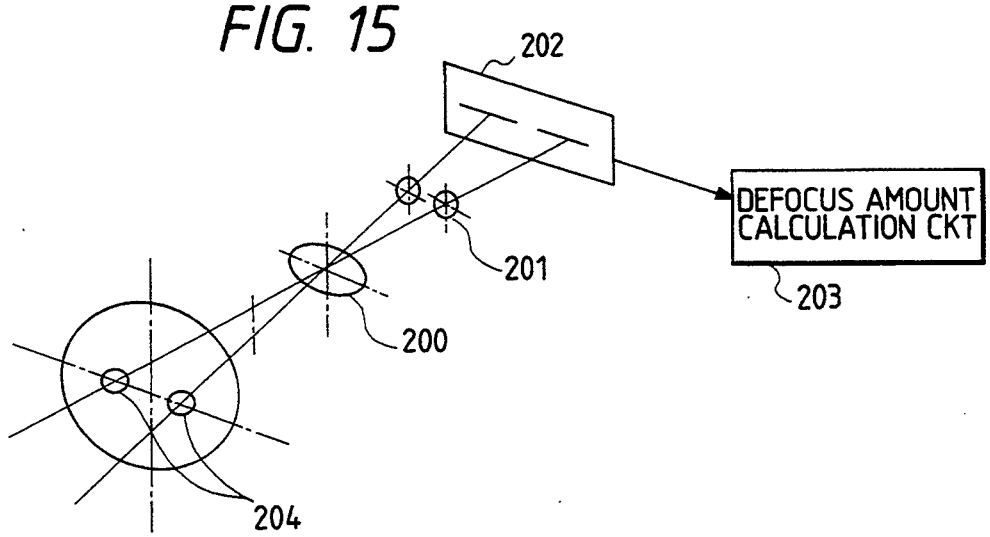
FIG. 15 is a drawing to show an example of construction of a focus optical system and a photo-electric converter.

FIG. 15 shows an example of construction of the focus detection optical system and the photo-electric converter.

The photo-electric converter 202 is a charge storage type image sensor such as the CCD sensor, onto which two object images are projected after passing through an exit pupil 204 of photo-taking lens 102 at different locations and then through a condenser lens 200 and a re-imaging lens 201, and which generates an image output according to the projected images. A defocus amount calculation circuit 203 effects predetermined algorithmic processing on the image output using pixel data after A-D conversion to obtain a defocus amount of photo-taking lens.

Figure 16:
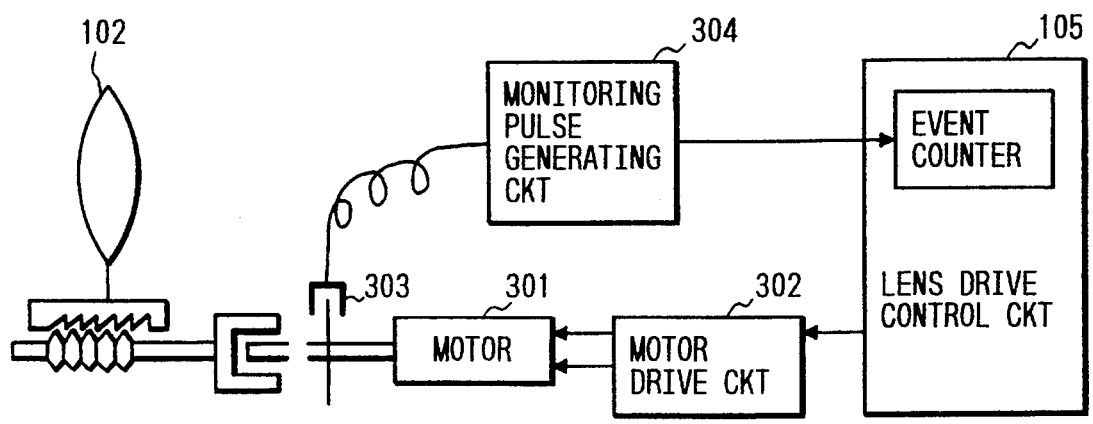
FIG. 16 is a drawing to illustrate a drive control circuit for driving a photo-taking lens.

FIG. 16 shows a drive apparatus of photo-taking lens. The drive apparatus comprises a lens drive motor 301, a motor drive circuit 302, and a motor drive amount monitoring pulse generating circuit 304 using a photo interrupter 303. An output of the monitoring pulse generating circuit 304 is input into the event counter in the lens control circuit 105. The lens control circuit 105 performs such a control that the photo-taking lens is driven at an image plane moving speed or with a defocus amount as will be described later.

The time count circuit 103, the speed detection circuit 104, and the lens control circuit 105 are constructed with dedicated hardwares and softwares therefor in a micon.

The operations of time count circuit 103, the speed detection circuit 104, and lens drive control circuit 105 will be described with the operation of microcomputer as described later. A schematic operation in the present invention is first described with a moving object as shown in FIG. 17.

Lens motion and object motion

Figure 17:
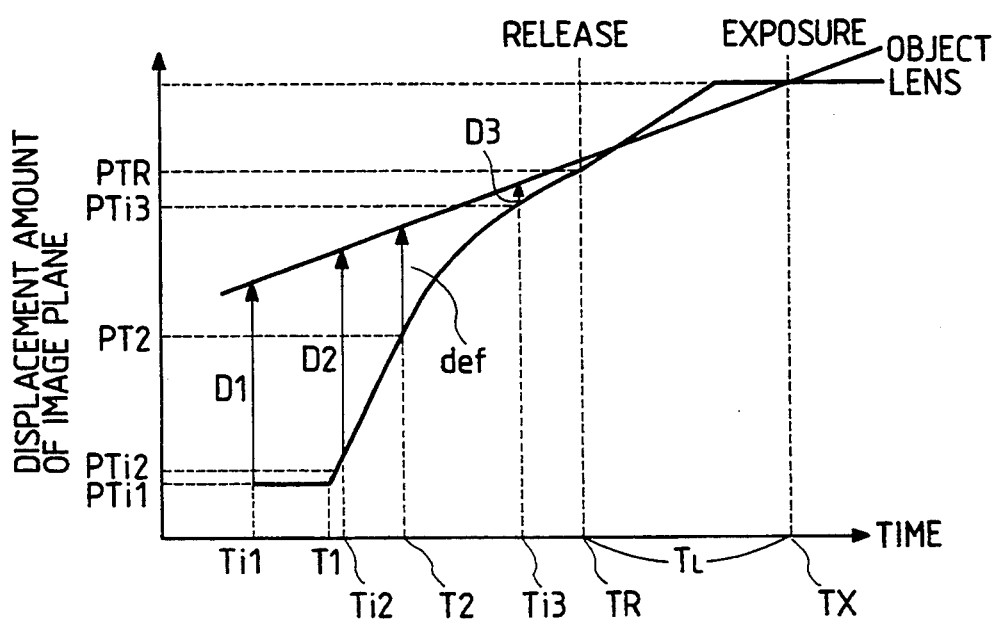
FIG. 17 is a drawing to illustrate the principle of operation for making the photo-taking lens pursuing a moving object.

FIG. 17 shows a lens motion and an object motion in the present embodiment, similarly as in FIG. 4, in which the horizontal axis represents the time and the vertical axis a displacement amount of lens image plane in the direction of optical axis.

Lens motion before release

A lens motion before release is the same as that in FIG. 4.

Storage of CCD is carried out at a stop lens position (Pti1) and at a time (Ti1), and the micon executes CCD data dump and focus detection algorithm to obtain a defocus amount (D1) of object at a point of time (T1). It cannot be judged at this point whether the object is moving. Thus, a drive control is started to drive the photo-taking lens with the defocus amount (D1). After the drive of lens is started, storage of CCD is again executed for next focus detection at a lens position (Pti2) and at a time (Ti2). A defocus amount (D2) of object is obtained at a time (T2) in the same manner as above. A moving speed of object can be calculated from these two defocus amounts and the time interval therebetween. Namely, if a change in defocus (Pti2)−(Pti1) due to the movement of lens itself between the two defocus originating positions is D1ns, an image plane moving speed of object may be obtained by Equation (11a).

$$S = (D2 - D1 - D1ns)/(Ti2 - Ti1) \tag{11a}$$

Once the speed of object is detected, the lens drive is controlled with the detected speed after the time (T2). However, a defocus amount is still present at the time (T2) between the lens and the object. If the lens position at the time (T2) is (Pt2), the defocus amount def at this point is obtained by Equation (12).

$$def = D2 - (Pt2 - Pti2) + (T2 - Ti2) \times S \tag{12}$$

In Equation (12) the term $D2-(Pt2-Pti2)$ represents a detection defocus amount corrected by a movement amount of lens itself, and the term $(T2-Ti2) \times S$ an image plane displacement amount due to the movement of object between the detection focus time (Ti2) and the time (T2).

As long as the defocus amount exists, the out-of-focus state is maintained even if the lens is driven at the same speed as the object. Accordingly, the remaining defocus amount (error) must be introduced into the drive control.

If the control amount corresponding to the error is f (def), f (def) will be an acceleration component with a parameter of defocus amount. There are various methods for absorbing this error depending upon control systems. If such a control method is employed that monitoring pulses generated according to a drive amount of motor are used in feedback for drive, as described below, a response is slow with a low contribution of f (def) term to the drive, to leave the defocus error unconverged. On the other hand, with a too high contribution over drive and control vibration would become outstanding. In the present embodiment, the following nonlinear function is employed considering the focus detection cycle time (about 50 ms at shortest) and the feedback cycle time for speed control (which is set shorter than the focus detection cycle time).

$$f(def) = K \times \log(def) \tag{13}$$

Further in the present embodiment, it is more preferable that the above function is modified by converting the defocus amount into corresponding pulse number (N), because the feedback for speed control is based on pulses generated per unit time and because a ratio between the image plane displacement amount and pulses varies depending upon interchangeable lenses. Accordingly, the above equation is modified into Equation (14).

$$f(def) = K \times \log(N) \tag{14}$$

where $N \geq 1$.

A calculated control speed may be thus obtained by Equation (15).

$$Sans = S + f(def) \tag{15}$$

The motor is driven with a control target speed of the thus calculated value.

After the lens is driven at the speed Sans to converge the defocus amount, f (def) becomes 0 and then the lens is speed-control-driven at the same speed as the image plane speed S of object.

Lens motion upon release

Next described is a case that the release is effected at an arbitrary time TR in FIG. 17. Upon release at the time TR, a drive amount to make the lens in focus at exposure is calculated using nearest detection focus amount (D3) and time (Ti3).

A defocus amount is first obtained at the release time TR. If a sufficient time elapsed after the lens is speed-controlled, the movement of lens is approximately along the motion of object, and the defocus amount is within a permissible range. Microscopically, there would be a control error caused. Thus, the defocus amount is not always "0". Therefore, it is effective to calculate the defocus amount at the release time TR.

The defocus amount at the release time TR may be obtained by the following equation in the same manner as Equation (12).

$$def(TR)=D3-(PtR-Pti3)+(TR-Ti3)\times S \quad (16)$$

A duration between the release time and the exposure time, which is a so-called time lag, is an intrinsic value TL (for example 80 ms) approximately set in each type of camera. A displacement of image plane of object moving in the duration is calculated with the speed S as follows.

$$def(TL)=TL\times S \quad (17)$$

Accordingly, a drive amount Z calculated at the point of release time TR may be calculated by Equation (18).

$$Z=D3-(PtR-Pti3)+(TR-Ti3)\times S+def(TL) \quad (18)$$

The position control of lens is carried out according to this drive amount Z.

Description of drive operation of lens

The operation of the invention using the micon is below described in detail with the flow thereof.

A schematic flow of control of micon is the same as in FIG. 5 illustrated for the first embodiment. The internal memory and the timer are initialized upon start of operation (S1); the focus detection routine is carried out to detect a defocus amount showing a focusing state of photo-taking lens (S2); the speed detection routine is carried out with the detected focus amount to obtain the image plane moving speed of object (S3); and the lens is driven to make the image plane position of object equal to the image plane position of photo-taking lens (S4); which are repetitively carried out.

The flow of focus detection is now described with reference to FIG. 6.

The micon controls the operation of photo-electric converter 202 to start photo reception (storage) (S11).

At this point, the micon writes as the time of photo reception (storage) start point into the internal memory a numerical value of internal free running counter which counts up at each 1 ms (S12). Also, the micon writes into the internal memory a value of event counter which receives an output of the monitoring pulse generating circuit (S13).

It is judged whether a storage time enough to obtain a proper output level of CCD elapsed (S14); a time of end point is written after the storage time elapsed (S15); a time at a middle point of storage time (between the storage start point and the storage end point) is obtained (S16); and the time of storage start point is added thereto and the total is stored (S17). In case that the storage time is sufficiently short, the stored value may be the time of storage start point.

This is added to the event count value written at the storage start point, and the result is stored as a storage position (S18). In case that the storage time is sufficiently short, the stored value may be the event count value stored at the storage start point.

The above process gives the time (Ti1) and the lens position (PTi1) of the focus detection.

Although the photo-taking lens is driven during charge storage, it is assumed that the lens position is constant during storage, in order to obtain the lens position during storage in the movement of photo-taking lens. Under this assumption an equivalent storage barycenter during storage is calculated by the following procedure with FIG. 7.

The number of pulses input into the event counter are calculated at each time interval tw, which is a sufficiently fine time, for example a time interval with resolution of 500 $\mu$s, from the storage start point. Then, a histogram as shown is obtained for the duration of storage. As seen from the drawing, an area is approximately calculated with sides of time and pulse number, and the area is divided by the storage time to obtain an equivalent pulse number Piw1. This Piw1 represents a position of imaginary storage barycenter as converted into pulses with a start point at the storage start time.

Then, the micon receives a photo-electrically converted output through an unrepresented A-D converter (S19), and executes a predetermined focus detection algorithm to obtain a defocus amount from the photo-electrically converted image output.

The speed detection routine is the same as in FIG. 8 for the first embodiment.

It is first judged whether a past focus detection is present (S31). Since there is no past focus detection for the first time, no movement detection of object is possible and the moving object flag Flag is cleared to 0, ending the routine (S38).

If there is a past focus detection, a difference Pti2—Pti1 is calculated between the event count values respectively stored in the past storage and in the present storage to obtain a lens movement amount (S32).

The obtained lens movement amount is then converted into an image plane displacement amount D1ns (S33).

This conversion is conducted by obtaining a defocus amount from pulse number, using Equation 19 as described below.

A difference Ti2—Ti1 is then calculated between the storage times respectively stored in the previous storage and in the present storage (S34), and an image plane moving speed S of Equation 11 is calculated (S35).

A motion judgement is then carried out (S36). A judgement about whether the object is moving or not cannot be done simply with the image plane moving speed S thus calculated. For example, focus detection errors and a dispersion thereof in detection speed become equivalent to the speed in a very low speed zone, so that the detection accuracy of speed is decreased. It is thus judged in the motion judgement for example whether the calculated speed exceeds a certain threshold value or whether the sign of image plane moving speed is the same as that of previous value. If this motion judgement shows that the object is moving (S37), a moving object flag Flag is set to 1 (S39) and the speed detection routine is finished.

The lens start routine after the speed detection routine is the same as in FIG. 9 for the first embodiment.

In the lens start routine, it is first judged whether object is moving (S41). If the object is still, a focusing state judgement about whether the lens is at the in-focus position (S43). If the lens is in focus (S44) the routine is ended thereafter. If the lens is out of focus, a lens position control amount as described with FIG. 10 is set to conclude the routine (S45). If the object is moving, a lens speed control amount as described with FIG. 12 is set (S45), and the lens start routine is ended.

The lens position control amount setting routine is the same as in FIG. 10.

The defocus amount is first converted into a drive pulse amount (S51). The defocus amount here is obtained by correcting the detection defocus amount, which is an output of AF algorithm, with the movement amount of lens, and represents an amount to be driven at this point of calculation.

Also, the drive pulse number may be calculated based on a relation between the image plane displacement amount determined for each lens and the rotation amount of coupling as shown in FIG. 16, and on a relation between the coupling rotation amount intrinsic in each camera body and monitoring pulses. For example, if coupling rotations per unit image plane displacement amount 1 mm is K1 (rev/mm) and if monitoring pulses generated per rotation of coupling is Kb (/rev), a corresponding pulse number N may be calculated with def of defocus amount by the following equation.

$$N = def \times K1 \times Kb \qquad (19)$$

Zones are set depending upon the calculated pulse number.

The zones are set to effect a successively decelerated drive to the final stop position so as to assure the stop accuracy.

If the drive pulse number N is smaller than a predetermined pulse number n1 (S52), Zone 1 is set such that a PWM duty of motor drive circuit is set to 25% and an event count interruption for generating interruption when certain pulses are input is set to N (S52).

If N is greater than the predetermined pulse number n1, it is compared with a predetermined pulse number n1+n2 (S53). If N is smaller than n1+n2, Zone 2 is set such that the PWM duty of motor drive circuit is set to 50% and the event count interruption to N−n1 (S55).

If N is greater than n1+n2, it is compared with a predetermined pulse number n1+n2+n3 (S55). Further, if N is smaller than n1+n2+n3, Zone 3 is set such that the PWM duty of motor drive circuit is set to 75% and the event count interruption to N−n1−n2 (S57). On the other hand, if N is greater than n1+n2+n3, Zone 4 is set such that the PWM duty of motor drive circuit is set to 100% (full drive) and the event count interruption to N−n1−n2−n3 (S57); the event count interruption is then accepted and the motor is turned on (S59); and the lens position control amount setting routine is thus completed.

The pulse numbers of respective zones as so set are arranged for example as to be 20 for Zone 1, 30 for Zone 3, and 40 for Zone 3. If the drive pulse number is 58 pulses, the drive is carried out in Zone 3 for first eight pulses after drive, then in Zone 2 for 30 pulses, and finally in Zone 1 for 20 pulses.

The event count interruption routine accepted in FIG. 10 is the same as in the first embodiment and as shown in FIG. 11. When the set pulses are input, this routine is carried out.

In this routine it is first judged whether the zone is Zone 1 or not (S61). If Zone 1 the fully decelerated drive in the final zone is completed, the motor is stopped by breaking it, the event count interruption is prohibited, and the routine is finished (S62).

If it is not Zone 1, it is judged whether Zone 2 or not (S63).

If it is not Zone 2, the event count interruption is reset to n1 which represents remaining pulses to be driven, the PWM duty of motor drive circuit to 25%, and Zone to 1 (S63), the event count interruption is accepted, and then the routine is finished (S67).

If it is not Zone 2, it is judged whether Zone 3 or not (S64). If Zone 3, the event count interruption is reset to n2 which represents pulses to be driven in Zone 2, Zone to 2, the PWM duty of motor drive circuit to 50% (S65), the event count interruption is accepted, and then the routine is finished (S67).

If it is not Zone 3, the drive in Zone 4 is completed, the event count interruption is reset to n3 which represents pulses to be driven in Zone 3, Zone to 3, the PWM duty of motor drive circuit to 75% (S66), the event count interruption is accepted, and then the routine is finished (S67).

FIG. 12 shows the lens speed control amount setting routine.

In this routine the control pulse number Ns per predetermined time is first calculated (S71). The speed was already calculated at S35. This speed represents a defocus amount per unit time (1 ms). If the detection time for feedback in control is for example 10 ms, the number of pulses to be input in 10 ms is calculated here.

If a number of coupling rotations per unit image plane displacement amount 1 mm is K1 (rev/mm) and a number of monitoring pulses generated when the coupling is rotated once is Kb (/rev), a speed control target pulse number Ns per control time 10 ms may be calculated with def of defocus amount by Equation (20).

$$Ns = def \times K1 \times Kb \times 10 \qquad (20)$$

A defocus amount is then calculated at this point of calculation. This defocus amount is calculated using Equation (2). This defocus amount is converted into pulses using Equation (19) (S72).

An acceleration correction amount is calculated from the converted pulse number with Equation (14) (S73). A control amount Q is calculated from the target pulse number Ns corresponding to a target speed and the acceleration correction amount K×log (N) (S74).

It is next judged whether the speed control is under operation (S75). If the speed control is not in progress, an initial value is set from a look-up table of Table 1 by selecting an approximate 8 bit register numerical value for setting the PWM duty in accordance with the control amount Q to be input in each predetermined time (10 ms in this case).

TABLE 1

Table for setting speed control PWM at start

| 8 bit register for setting PWM duty | Pulses/10 ms |
|---|---|
| 32 | 3 |
| 48 | 5.5 |
| 64 | 8 |
| 80 | 10 |
| 96 | 12 |
| 112 | 16 |
| 128 | 20 |
| 144 | 22 |
| 160 | 24 |
| 176 | 26 |
| 192 | 29 |

TABLE 1-continued

Table for setting speed control PWM at start

| 8 bit register for setting PWM duty | Pulses/10 ms |
|---|---|
| 208 | 32 |
| 224 | 34 |
| 240 | 36 |

This initial value is loaded to set in the PWM register (S76), the motor is turned on (S77), the event count value ECNTm at this moment is stored (S78), the speed control timer interruption (for example set at 10 ms) is reset and started (S79), and the lens speed control amount setting routine is completed.

Immediately after the start, pulses equal to the control value Q are not always input in each predetermined time (10 ms) with the initially set PWM duty (that is, the control is not always effected at a desired speed) due to fluctuations of power voltage and a load of lens. However, the PWM duty gradually approaches the desired speed by feedback to set proper input pulses to the target control amount Q, as described below.

If the speed control is in progress, the setting of initial value (S76) and the turning-on of motor (S77) are omitted.

FIG. 13 shows the speed control timer interruption routine set in FIG. 12.

The event count value is first read (S81), and an actual pulse number ECNTJ input in 10 ms is obtained from a difference between the read event count value and the stored event count value ECNTm (S82). An error rate is calculated from a difference between the actual pulse number ECNTJ and the target control amount Q already calculated at S84 (S83), and the PWM duty is refreshed with the error rate (S84).

A defocus amount of lens to object at the point of speed control timer interruption is calculated in the same manner as by Equation (12) (S85). In this case Pt2 and T2 should be replaced with Pt2' and T2' at the time of calculation.

$$def = D2 - (Pt2' - Pti2) + (T2' - Ti2) \times S \quad (21)$$

Further, the obtained defocus amount is converted into pulse number (S86), a correction amount is calculated based on Equation (4) (S87), and a target control amount Q for next speed control timer interruption is newly calculated (S88). The stored value ECNTm of event count value is then refreshed (S89), the speed control timer interruption is reset and started (S90) and the speed control timer interruption routine is completed.

The PWM duty control (speed control) by the speed control timer interruption is repeated several times before latest speed and defocus amount are calculated with a new focus detection result, in each of which the feedback is effected to make the lens pursue a trace of object.

Figure 18:
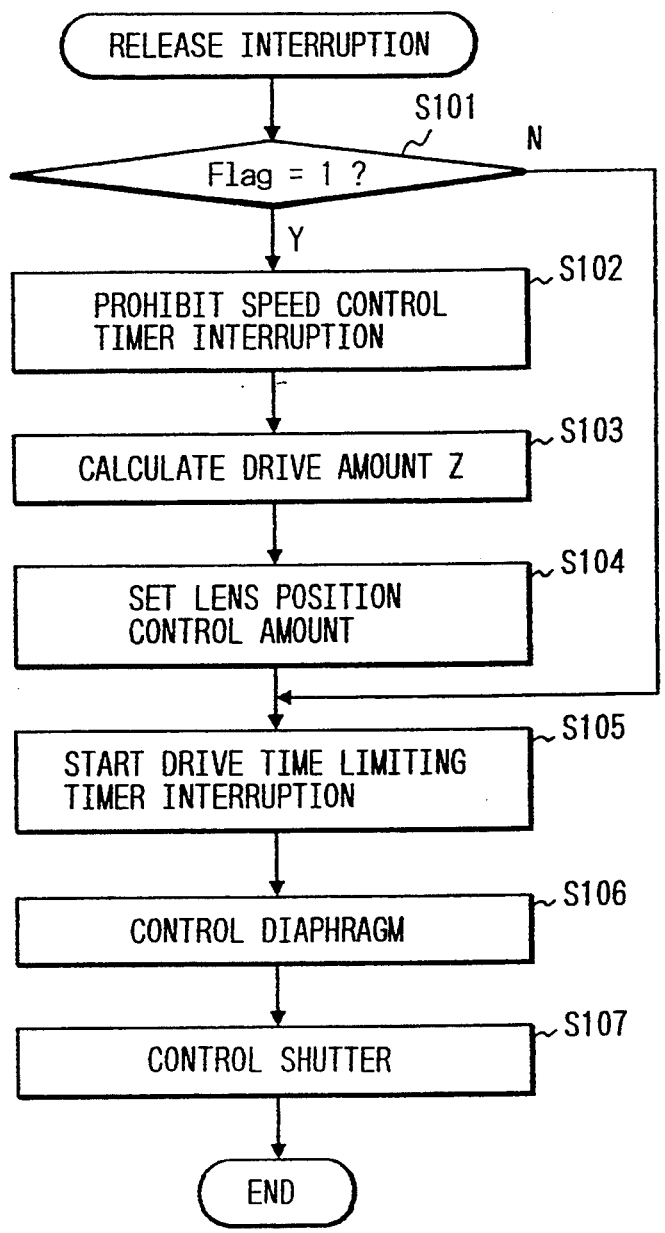
FIG. 18 is a flowchart to show a release interruption routine.
Figure 19:
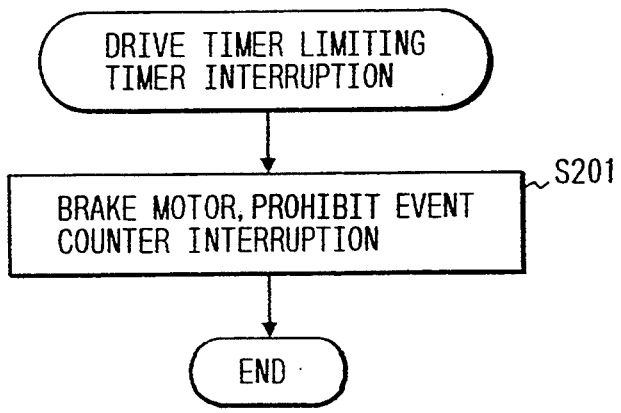
FIG. 19 is a flowchart to show a drive time limiting timer interruption routine.

FIG. 18 shows a release interruption routine. It is first judged whether the speed control is in progress (S101). If the speed control is not in progress, the lens is in drive to a still object or in a non-driven state. Accordingly, the flow jumps to a drive time limiting timer interruption start routine without newly starting the lens drive (S105). If the speed control is in progress, the speed control timer interruption is prohibited (S102). Then, a drive amount Z, which is a defocus amount determined taking a time lag TL into consideration, is calculated (S103). The drive amount Z is calculated by Equation (18) as described above. Once the drive amount Z is obtained, the lens position control amount setting routine is carried out to drive the photo-taking lens to the in-focus position at the time of exposure (S104). This may be the same operation as that described in FIG. 10. After that, the drive time limiting timer interruption start routine (S105) as shown in FIG. 19 is carried out. Further, the diaphragm control is carried out (S106), the shutter control is then performed (S107), and the release interruption routine is ended.

As described, the drive control of lens is switched from the speed control into the position control at the time of release, so that the lens is controlled to become in focus on the moving object at the time of exposure as shown in FIG. 17.

FIG. 19 shows the drive time limiting timer interruption start routine. This is set in 70 ms if the time from the release to exposure is for example 80 ms, in order to stop the lens surely at the time of exposure. This arrangement permits the lens to be stopped even if the drive amount is so large as to remain some at the time of exposure (S201).

According to the second embodiment as described, the photo-taking lens is speed-controlled before release such that the image plane moving speed of photo-taking lens is made equal to the image plane moving speed of object, so that the lens may be driven in a smooth manner to pursue the moving trace of object. After release, the lens is moved taking as the defocus amount the image plane position of lens after the predetermined time, so that the image plane position of photo-taking lens may be accurately made coincident with the image plane position of object at the time of exposure.

What is claimed is:

1. An automatic focusing apparatus comprising:
   a drive device which drives a photo-taking lens in accordance with a speed command value;
   a focus detection device which repetitively detects a defocus amount representing a focusing state of said photo-taking lens;
   a time count circuit which measures a detection time interval for detection of the focus detection device;
   an object speed calculating circuit which calculates a moving speed of an object image plane, based on the defocus amount detected by said focus detection device and the detection time interval measured by said time count circuit;
   a speed control circuit which outputs to said drive device a speed command value for always equalizing an image plane moving speed of said photo-taking lens to the moving speed of said object image plane calculated by said object speed calculating circuit; and
   a speed correcting circuit which corrects the speed command value output from said speed control circuit in accordance with the defocus amount detected by said focus detection device.

2. An automatic focusing apparatus according to claim 1, further comprising a movement amount monitoring pulse generating device which generates monitoring pulses depending upon a movement amount of said photo-taking lens;
   wherein said speed control circuit calculates a number of generated photo-taking lens movement amount monitoring pulses per unit time, based on the moving speed of said object image plane calculated by said object speed calculating circuit;

wherein said speed correcting circuit calculates a number of generated photo-taking lens movement amount monitoring pulses per unit time, based on the defocus amount detected by said focus detection device; and wherein said drive device drives said photo-taking lens while feeding back the monitor pulses from said movement amount monitoring pulse generating circuit to the speed command value to which the pulse numbers respectively calculated by said speed control circuit and said speed correcting circuit are added.

3. An automatic focusing apparatus comprising:

a focus detecting device which repetitively detects a defocus amount representing a focusing state of a photo-taking lens;

a time counting circuit which measures a time interval between times of focus detection repetitively detected by the focus detecting device;

an object image plane speed detecting circuit which calculates an object image plane moving speed, based on the defocus amount detected by said focus detecting device and the time interval of said time counting circuit;

a speed control device which controls an image plane moving speed of said photo-taking lens such that the object image plane speed obtained by the object image plane speed detecting circuit is made coincident with the image plane moving speed of said photo-taking lens;

a position control circuit which calculates a defocus amount for making an object image plane position coincident with an image plane position of said photo-taking lens after a predetermined time, based on the defocus amount detected by said focus detecting device and the object image plane speed obtained by said object image plane speed detecting circuit and for position-controlling said photo-taking lens, based on the thus calculated defocus amount;

a lens control device which moves the photo-taking lens at the image plane moving speed by said speed control circuit before a release, but with the defocus amount by said position control circuit after the release; and a lens drive device which drives said photo-taking lens with said image plane moving speed or said defocus amount by the lens control device.

4. An automatic focusing apparatus according to claim 3, further comprising a speed correcting circuit for correcting the image plane moving speed of the photo-taking lens obtained by said speed control circuit in accordance with the defocus amount detected by said focus detecting device circuit.

* * * * *